(12) United States Patent
Barth

(10) Patent No.: US 7,457,816 B2
(45) Date of Patent: Nov. 25, 2008

(54) METHOD FOR DEPICTING AN OBJECT DISPLAYED IN A VOLUME DATA SET

(75) Inventor: Karl Barth, Höchstadt (DE)

(73) Assignee: Siemens Aktiengesellschaft, Munich (DE)

( * ) Notice: Subject to any disclaimer, the term of this patent is extended or adjusted under 35 U.S.C. 154(b) by 374 days.

(21) Appl. No.: 10/535,118

(22) PCT Filed: Oct. 17, 2003

(86) PCT No.: PCT/EP03/11552

§ 371 (c)(1),
(2), (4) Date: May 16, 2005

(87) PCT Pub. No.: WO2004/047028

PCT Pub. Date: Jun. 3, 2004

(65) Prior Publication Data

US 2006/0152502 A1   Jul. 13, 2006

(30) Foreign Application Priority Data

Nov. 15, 2002   (DE) ................................ 102 53 617

(51) Int. Cl.
*G06F 17/30* (2006.01)
(52) U.S. Cl. ....................................... 707/102; 345/419
(58) Field of Classification Search ......... 707/200–206, 707/100, 102, 104.1; 345/419, 582, 598
See application file for complete search history.

(56) References Cited

U.S. PATENT DOCUMENTS

| 6,661,914 | B2 * | 12/2003 | Dufour | 382/154 |
| 6,720,966 | B2 * | 4/2004 | Barth et al. | 345/424 |
| 7,133,041 | B2 * | 11/2006 | Kaufman et al. | 345/419 |

FOREIGN PATENT DOCUMENTS

| EP | 0621 546 A2 | 10/1994 |
| EP | 0 642 104 A1 | 3/1995 |
| EP | 1 001 379 A2 | 5/2000 |
| EP | 1 054 349 A2 | 11/2000 |
| EP | 1 056 049 A2 | 11/2000 |
| WO | WO 02/50779 A1 | 6/2002 |

OTHER PUBLICATIONS

Foley, J.D., et al., "Computer Graphics—Principles and Practice", Addison-Wesley, 1996, S. 610, 611, 1034-39.
D. Ebert, et al., "Volume Illustration: Non-Photorealistic Rending of Volume Models", Proceedings Visualization 2000. Vis 2000. Salt Lake City, UT, Oct. 8-13, 2000, Annual IEEE Conference on Visualization, Los Alimos, CA: IEEE Comp. Soc., US Oct. 8, 2000, S. 195-201.

* cited by examiner

*Primary Examiner*—Cheryl Lewis
(74) *Attorney, Agent, or Firm*—Schiff Hardin LLP

(57) ABSTRACT

A method is provided for depicting an object displayed in a first volume data set. A second volume data set is firstly produced by modulating, according to depth, the volume elements of the first volume data set along a main viewing direction that passes into the first volume data set. Afterwards, the second volume data set undergoes a volume rendering.

16 Claims, 3 Drawing Sheets

METHOD FOR DEPICTING AN OBJECT DISPLAYED IN A VOLUME DATA SET

BACKGROUND

The invention concerns a method for representation of a subject represented in a volume data set.

Images acquired with modern imaging medicine-related apparatuses in particular exhibit a relatively high resolution, such that enhanced 3D exposures (volume data sets) can be generated with them. Imaging medicine-related apparatuses include, for example, ultrasound, computer tomography, magnetic resonance or x-ray apparatuses or Positron Emission Tomography (PET) scanners. Furthermore, computer tomography (CT) or x-ray apparatuses can be used more often since a radiation exposure that an organism is exposed to during an examination with one of these apparatuses has decreased.

However, volume data sets contain a larger data quantity than image data sets of conventional two-dimensional images, which is why an evaluation of volume data sets is relatively time-consuming. The actual acquisition of the volume data sets lasts approximately half a minute, in contrast to which a half-hour or more is often needed to thin out and prepare the volume data set. Automatic detection and preparation methods are therefore necessary and welcome.

Until approximately the year 2000, it was typical (nearly) only in computer tomography (CT) to make a diagnosis using axial slice stacks (slice images) or to at least orient oneself predominantly on the slice images for a diagnosis finding. Thanks to the increased computing capacity of computers, 3D representations have expanded to finding consoles since approximately 1995; however, they initially had a more scientific or supplementary importance. In order to make a diagnosis easier for a doctor, four basic methods of 3D visualization have also been developed:

1. Multiplanar reformatting (MPR): This is nothing other than a reconfiguration if the volume data set is in a different orientation than, for example, the original horizontal slices. In particular, differentiation is made between orthogonal MPR (3 MPRs, respectively perpendicular to one of the original coordinate axes), free MPR (angled slices; derived, i.e., interpolated) and curved MPR (slice generation parallel to an arbitrary path through the image of the body of the organism and, for example, perpendicular to the MPR in which the path was plotted).

2. Shaded surface display (SSD): Segmenting of the volume data set and representation of the surface of the excised objects, most strongly characterized by orientation to the gray values of the image (for example, CT values) and manual auxiliary editing.

3. Maximal intensity projection (MIP): Representation of the highest intensity along each ray. Only a partial volume is represented in what is known as Thin MIP.

4. Volume rendering (VR): This is a modeling using rays that penetrate into the subject or exit from the subject comparable to x-rays. The entire depth of the imaged body (partially translucent) is thereby acquired; however, details of small objects and especially objects shown in a thin layer are lost. The representation is manually characterized by adjustment of "transfer functions" (color lookup tables). Illumination effects can be to be mixed in, in that further storage planes are used in which gradient contribution and direction for the illumination are stored and allowed for in the representation.

However, a disadvantage of the known methods is the insufficient representation of relatively fine structures, particularly when a relatively large volume data set is present. A further disadvantage of the known method is that respectively only the entire 3D block is shown in a fixed context.

SUMMARY

It is therefore the object of the invention to specify an advantageous method to show relatively fine structures, particularly structures imaged in a relatively large volume data set.

The object of the invention is achieved by a method for representation of a subject imaged in a first volume data set, which method comprises the following method steps:

generating a second volume data set in which the volume elements of the first volume data set are modulated and/or coded, dependent on depth, parallel to the main observation direction running in the first volume data set, and applying volume rendering on the second volume data set.

It is a goal and object according to various embodiments of the inventive method to achieve a continuous 3D representation through the entire depth of the imaged subject via a further development of the volume rendering, without a special segmentation of the subject imaged in the first volume data set. The first volume data set is, for example, generated with a computer tomograph or a magnetic resonance apparatus, in general with an imaging apparatus that is suitable for generation of a volume data set.

Additionally, a spatial and plastic impression of the imaged subject is inventively, simultaneously achieved via a depth shading. For this, the second volume data set is inventively produced from the first volume data set, in that preferably all volume elements (in CT, for example, in Hounsfield units) of the first volume data set are depth-dependently modulated or coded and stored in the direction of the main observation direction, and the known volume rendering is applied to the second volume data set. Volume rendering is, for example, described in Foley et al., "Computer Graphics: Principle and Practice, 2nd edition, Addison-Wesley, 1990, pages 1034 through 1039.

For example, on the one hand, in the sense of a depth shading, the plastic 3D impression is thus improved in cooperation with "alpha blending". The alpha value determines the transparency or opacity of the represented subjects and is defined for each possible value of the volume data. On the other hand, a continuous selection possibility results for the respectively shown depth range. This is non-trivial since, for example, a broad spectrum of measurement values exists in computer tomography.

The imaged subject is, for example, a body of an organism. A specific density of contrast agent or bone (spinal column) further back in the imaged body of the organism with a strong opaquely-set alpha is always x-rayed towards the front with regard to a viewing direction (ray) of an observer when occluding objects along the ray extend only to a limited extent and exhibit an alpha that is set less opaque (i.e., transparent). This contradiction cannot be resolved with conventional volume rendering. In an occlusion line (along the ray), only one subject can ever actually be shown completely clearly and a switch over to the representation of other subjects entails effort and significant modification of the image impression.

Via depth selection, particularly in real time, embodiments of the inventive method now offer the possibility to represent all partial subjects (organs) without change of the overall impression, with complete contrast and depth shading. In a manner of speaking, a further alpha is impressed on the volume data set in the main observation direction with a different inertia/energy than the exponential decay of the alpha blending and adjusted to the preservation of the density modulation in the first volume data set (in CT, for example, in Hounsfield units). This is applied such that a depth shading (thus a shadow formation at the edges from the front to the back) results locally on the imaged partial subjects, where all partial subjects appear plastic.

For example, with a sliding control, the depth range to be shown can be continuously adjusted, where the sliding control acts on a sub-range of the transfer function that is shifted on the value scale of the modulated or coded volume data set. Advantageously, the updating of the representation can particularly ensue in real time because the volume data are already stored beforehand in the suitable modulation or coding, e.g., in a display storage, for example, of a conventional graphic card. This adjustment is also comparable with the adjustment of the depth of field in photography. However, in contrast to the photographic depth of field, here the possibility exists to define the front and rear edge significantly more precisely, for example, with a rectangular transfer function, which is primarily important to the observer in order to completely fade out viewing obstacles.

The corresponding design of the transfer function involves, in the simplest case (for example) ramp functions falling off to the rear with regard to the observer when a depth shading from the front to the back is desired or (as it is provided according to an embodiment of the invention) in the form of a modified rectangle or bar whose canted upper edge falls off to the rear, the coded or modulated storage of the volume in the form of the second volume data set in the storage.

According to an embodiment of the inventive method, the transfer function is stored in a lookup table. Instead of a slide control, a mouse or other controller, the depth adjustment can also be implemented by way of a navigation system as it is provided according to a further embodiment of the inventive method. In this case, both the viewpoint and the perspective (as in conventional volume rendering) and the selection of the current volume data to be represented in real time are set by the navigation system. This enables a "fly through" through all volume data of an inherently closed, imaged subject. Previously known methods allow this only via selection in the data (MIP-only maximum values, but over the entire volume), via selection of a special path through hollow spaces connected with pre-segmentation (actual fly-through) or via elaborate pre-calculations (segmentation, coloring, actually another data selection).

A further improvement of the representation of the imaged subject, primarily the speed of the representation, is achieved according to embodiments of the inventive method when a "texture mapping" is additionally implemented (particularly according to the shear warp method), the volume elements of the first and/or second volume data set are interpolated, the first and/or second volume data set are filtered and/or the result of the filtering of the first volume data set and/or the result of the filtering of the second volume data set are buffered.

DESCRIPTION OF THE DRAWINGS

An exemplary embodiment of the invention is shown in the accompanying schematic drawings.

DETAILED DESCRIPTION OF THE PREFERRED EMBODIMENTS

Figure 1:
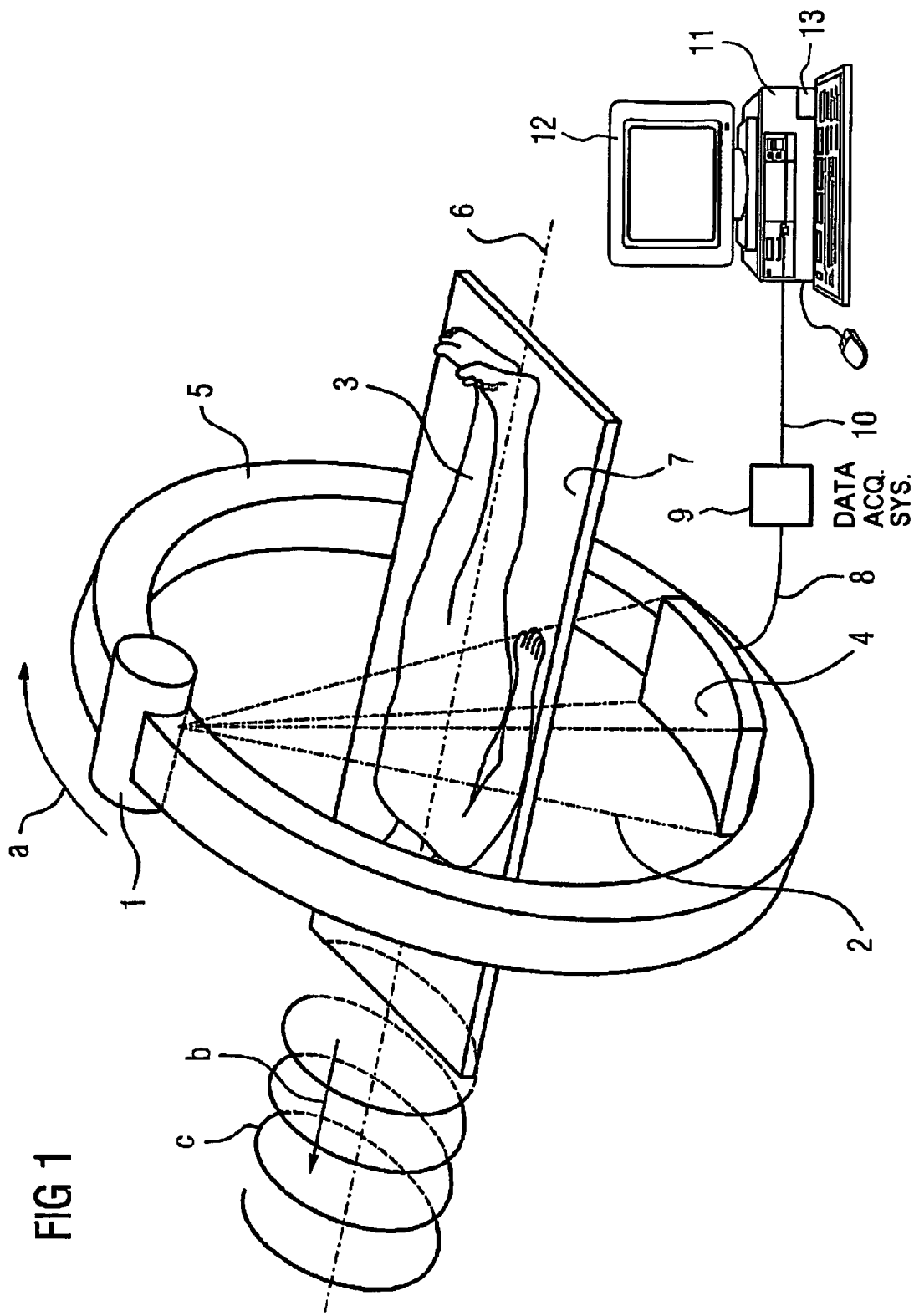
FIG. 1 is an isometric/pictorial schematic drawing of a computer tomograph.

FIG. 1 schematically shows a computer tomograph with an x-ray source 1 from which a pyramidal x-ray beam 2 emanates whose edge rays are shown as dashed lines in FIG. 1. The x-ray beam 2 penetrates an examination subject (for example, a patient 3) and impinges on a radiation detector 4. In the case of the present exemplary embodiment, the x-ray source 1 and the radiation detector 4 are arranged opposite one another on an annular gantry 5. The gantry 5 is borne on a mounting device (not shown in FIG. 1) such that it can rotate with regard to a system axis 6 which runs through the center point of the annular gantry 6 (in a direction indicated by arrow a).

In the case of the present exemplary embodiment, the patient 3 lies on a table 7 transparent to x-radiation. This table 7 is borne by a carrier device (likewise not shown in FIG. 1) such that this table 7 can shift along the system axis 6 (in a direction indicated by arrow b).

The x-ray source 1 and the radiation detector 4 thus form a measurement system that is rotatable relative to the system axis 6 and can shift relative to the patient 3 along the system axis 6 such that the patient 3 can be irradiated from different projection angles and various positions with regard to the system axis 6. Once the radiation detector 4 produces the output signals, a data acquisition system 9 forms measurement values that are supplied to a computer 11 that (via known methods) calculates an image of the patient 3 that can in turn be reproduced on a monitor 12 connected with the computer 11. In the case of the present exemplary embodiment, the data acquisition system 9 is connected to the radiation detector 4 with an electrical line 8 that (in a manner not shown), for example, comprises a slip ring system or a wireless transmission path and to the computer 11 with an electrical line 10.

The computer tomograph shown in FIG. 1 can be used both for sequence scanning and for spiral scanning.

In the sequence scanning, a slice-by-slice scanning of the patient 3 ensues. The x-ray source 1 and the radiation detector 4 are rotated around the patient 3 with regard to the system axis 6 and the measurement system comprising the x-ray source 1 and the radiation detector 4 acquires a plurality of projections in order to scan a two-dimensional slice of the patient 3. A slice image representing the scanned slice is reconstructed from the measurement values thereby acquired. The patient 3 is respectively moved along the system axis 6 between the scanning of successive slices. This event is repeated until all slices of interest are acquired.

During the spiral scan, the x-ray source 1 and the measurement system comprising radiation detector 4 move continuously in the direction of the arrow b relative to the system axis 6 and the table 7, i.e. the measurement system comprising the x-ray source 1 and the radiation detector 4 move continuously on a spiral path c relative to the patient 3 until the region of interest of the patient 3 is completely acquired. This generates a volume data set that, in the case of the present exemplary embodiment, is coded according to the DICOM standard typical in medical technology.

In the case of the present exemplary embodiment, a volume data set (comprised of a plurality of successive slice images) of the abdominal region of the patient 3 is created with the computer tomograph shown in FIG. 1 with approximately 500 CT slices (slice images) of the matrix 512×512.

The volume data set is, for example, interpreted as slices parallel to the table 7 for the application in minimally-invasive surgery/laparoscopy. The slice orientation (coronary) is approximately at a right angle to the viewing direction of a doctor (not shown in FIG. 1) who normally views approximately perpendicular to the abdominal wall of the patient 3.

Figure 2:
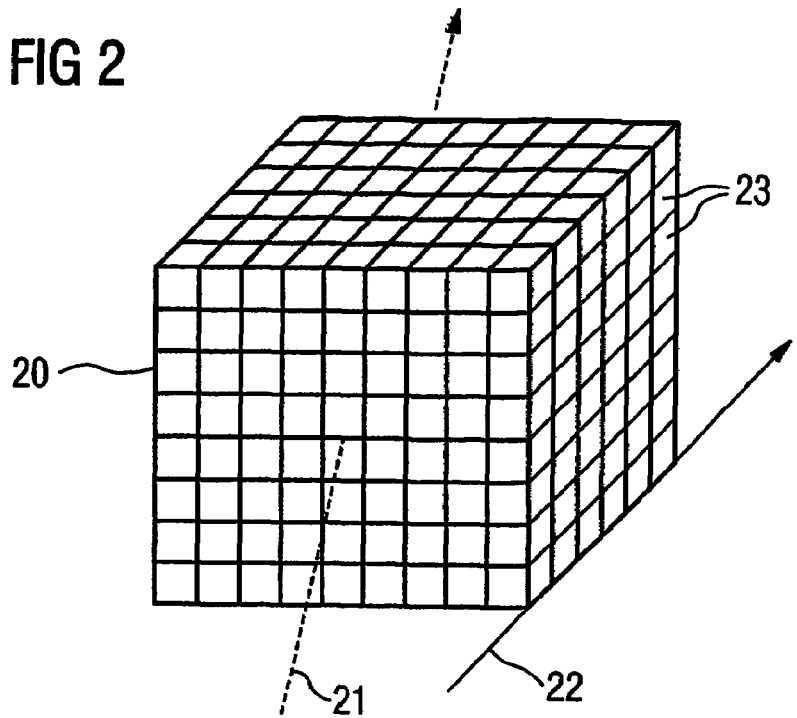
FIG. 2 is a three-dimensional pictorial illustration of a first volume data set with a virtual ray, acquired with the computer tomograph.

In the case of the present exemplary embodiment, these slices are interpreted as textures or interpolated multi-textures and accounted for in a 3D representation according to the shear warp method (a known characteristic of volume rendering). The volume data set 20 created from this is schematically shown in FIG. 2. A virtual ray 21 emanating in approximately the viewing direction of the doctor and running into the volume data set 20 is shown as a dashed line in FIG. 2. That coordinate axis of the original volume data set which, in the preferred observation direction of the operator, has the smallest angle relative to the ray 21 (and thus runs closest to parallel to the ray 21 in the preferred direction) is designated as a main observation direction 22.

The specified method functions relatively well with this one preferred direction for large data sets, as in this example, and also for deflections of the viewing direction up to approximately +/−80° to the sides or up/down. For an improved representation, one redirects to +/−45°, for example, to slices that stand perpendicular to the first orientation (axial or sagittal).

In principle, in the case of the preferred exemplary embodiment, the 3D data are stored exclusively for a color lookup mode including black-and-white representation. On the one hand, for relatively large data sets, this means a minimal storage requirement (for example, 8-bit in 3D, for example, 32-bit only for the display); on the other hand, this means the possibility that the representation can be modified or adapted via modification of the lookup table in real time.

Figure 3:
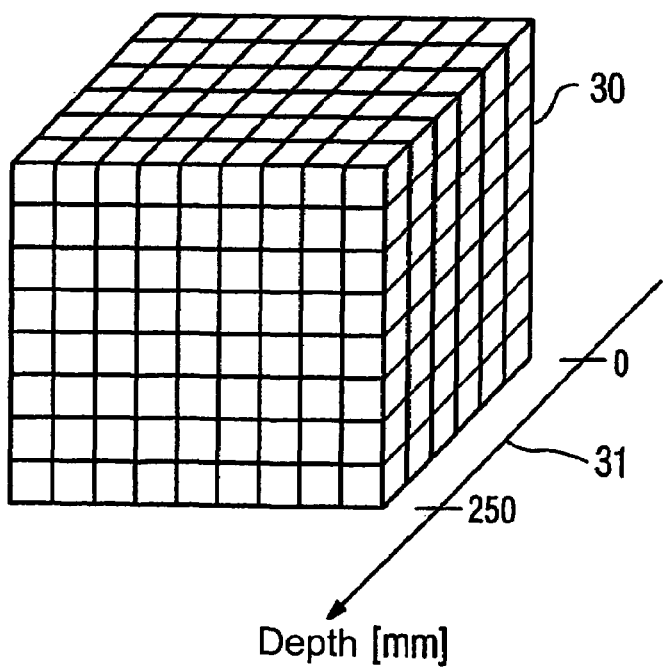
FIG. 3 is a three-dimensional pictorial illustration of a further volume data set produced from the volume data set shown in FIG. 2.

A connection of the representation control with shading and depth information is now inventively provided via a lookup table. For this, in the case of the present exemplary embodiment, a further volume data set 30 (shown in FIG. 3) is produced in which the volume elements 23 of the volume data set are modulated per voxel with a depth value along the edge-parallel main observation direction as well as possibly with further filter responses and, coded via this one-time pre-processing, are stored in the working storage of the graphics card 13 of the computer 11.

In the case of the present exemplary embodiment, the modulation of the individual volume elements 23 of the volume data set 20 occurs along the main observation direction 22, and such that the gray values (for example, Hounsfield units in CT) of the volume elements 23 of the volume data set 20, which are further removed from the viewpoint of an observer along main observation direction 2, are accounted for with a smaller factor than the gray values of the volume elements 23 that are located closer to the observer.

The further volume data set 30 is subsequently accounted for in real time in the representation with an alpha value possibly modified relative to the other volume rendering and shown cooperating with a lookup table (transfer function).

Figure 4:
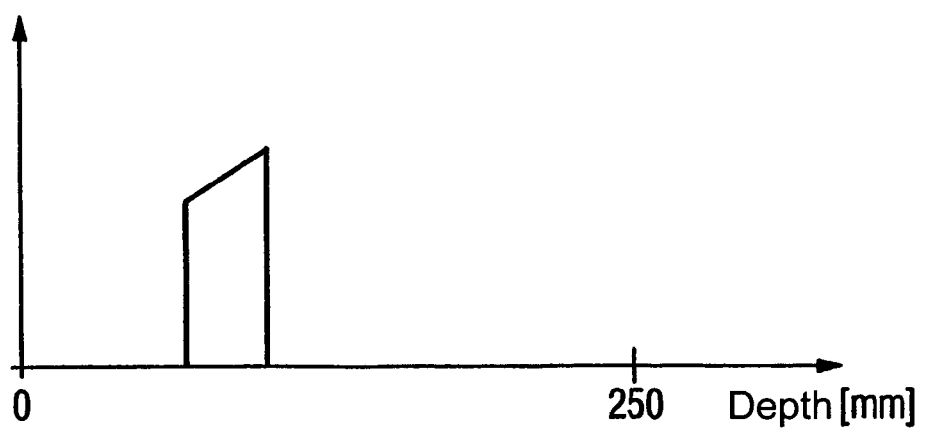
FIG. 4 is a graphical representation of a transfer function.

In the case of the present exemplary embodiment, the transfer function has the form of a canted bar 40, as schematically shown in FIG. 4. The coding in the volume data set 30 and the application of the transfer function ensues such that the displacement range of the canted bar 40 corresponds to the depth of the volume data set 30, and therewith the entire color or gray value range (in 8-bit, for example, 256 elements in size) of the volume elements of the data set 30 can be imaged. The depth of the further volume data set 30 is shown with an axis 31.

In the real-time generation of the 3D view, each of the coded slices (textures) of the further volume data set 30 is distorted as it corresponds to the current perspective view with central ray 21 and then ultimately added into an accumulator texture after multiplication with the cited blending alpha. In the case of the present exemplary embodiment, a real-time interpolation is also used in the graphics card 13.

The accumulator storage (for example, a display buffer) in the graphics card 13 contains a shaded, if applicable, edge-emphasized 3D image with the same coding and accounting, in which are shown one or more depth ranges of the original volume data set 20 shown in FIG. 2. The sensing of the desired depth ensues via the corresponding setting of the lookup table. A refined, also non-linear, coding can be effected in order to, for example, more clearly separate or fade out uninteresting structures such as (in most cases) bones (ribs). Such a special coding should be oriented to the conditions of the scale of the measurement values, in the case of the present exemplary embodiment, the Hounsfield units of the individual volume elements of the volume data set 20.

For example, the values of the lookup table (transfer function) appear so: the canted rectangle extends into the depth range of approximately 136 mm to 120 mm, corresponding to positions 136 through 120 for the lookup function. Given pure gray-value coding, the display color value "255, 255, 255" stands in position 136, decreasing, for example, to the value "50, 50, 50" at position 120. This is amplified by the depth coding in the volume data set 30, in that, for example, in a lateral plan view of a subject surface, surface volume elements lying further to the rear are rendered transparently darker in the alpha integration than volume elements lying further towards the front, and the plastic or the amplified spatial effect results from this.

The overall accountings are, for example, activated by a shift control or a mouse movement or ensue continuously via updates of the position and orientation coordinates of a navigation system (not shown in detail in FIG. 1, but generally known), such that approximately 15 renderings per second are achieved, for example, with standard graphics cards obtainable at present.

Figure 5:
FIG. 5 is an image representation produced by way of the inventive method.

A representation produced with the inventive method is exemplarily shown in FIG. 5 in the form of an image 50.

In the case of the present exemplary embodiment, the volume data set 20 is produced with a computer tomograph and exists in the form of a plurality of successive computer-tomographic slice images. The volume data set 20 can, however, also be produced with other imaging apparatuses such as, in particular, a magnetic resonance apparatus, an x-ray apparatus, a ultrasound apparatus or a PET scanner. The volume data set 20 also does not have to exist in the form of a plurality of successive computer-tomographic slice images.

The inventive method can also be used for imaged technical subjects.

The exemplary embodiment likewise has only exemplary character.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptions will be readily apparent to those killed in this art without departing from the spirit and scope of the present invention.

The invention claimed is:

1. A method for representing a subject imaged in a first volume data set, comprising:
    generating a second volume data set from the first volume data set in which the volume elements of the first volume data set are at least one of depth-dependently modulated and coded parallel to a main observation direction along a coordinate axis of running into the first volume data set; and
    applying a volume rendering to the second volume data set; and
    outputting, on a display, an image based on the second volume data set.

2. The method according to claim 1, further comprising utilizing a transfer function for activating a depth-dependent 3D representation.

3. The method according to claim 2, wherein the transfer function for the volume rendering has the form of a canted bar.

4. The method according to claim 2, wherein the transfer function is stored in a lookup table.

5. The method according to claim 1, further comprising controlling the volume rendering with a navigation system.

6. The method according to claim 5, further comprising:
    storing beforehand segmented partial subjects with a color value that corresponds to a specially-reserved range of a lookup table, such that they can be illuminated with their own coloring relative to their surroundings, relative to other subjects of a described volume rendering, and can thereby be specifically addressed with the navigation system.

7. The method according to claim 1, further comprising manually controlling the volume rendering with a computer input apparatus.

8. The method according to claim 1, further comprising applying texture mapping to the first or second volume data set.

9. The method according to claim 8, wherein the texture mapping is performed according to a shear warp method.

10. The method according to claim 8, wherein the texture mapping is implemented with multi-textures.

11. The method according to claim 8, wherein the texture mapping is implemented with hardware of a graphics card.

12. The method according to claim 1, further comprising interpolating volume elements of at least one of the first and second volume data set.

13. The method according to claim 1, further comprising filtering at least one of the first and second volume data set.

14. The method according to claim 13, further comprising buffering at least one of a result of the filtering of the first volume data set and a result of the filtering of the second volume data set.

15. A method as claimed in claim 1, further comprising the step of:
    controlling a depth range of objects in a displayed image by a control that shifts a transfer function on a value scale of the second volume data set.

16. A method as claimed in claim 15, wherein said control is a navigation system.

* * * * *